No. 747,584. PATENTED DEC. 22, 1903.
R. BRAUN.
COMBINED HEATER AND STOCK FEED COOKER.
APPLICATION FILED APR. 16, 1903.
NO MODEL. 2 SHEETS—SHEET 1.
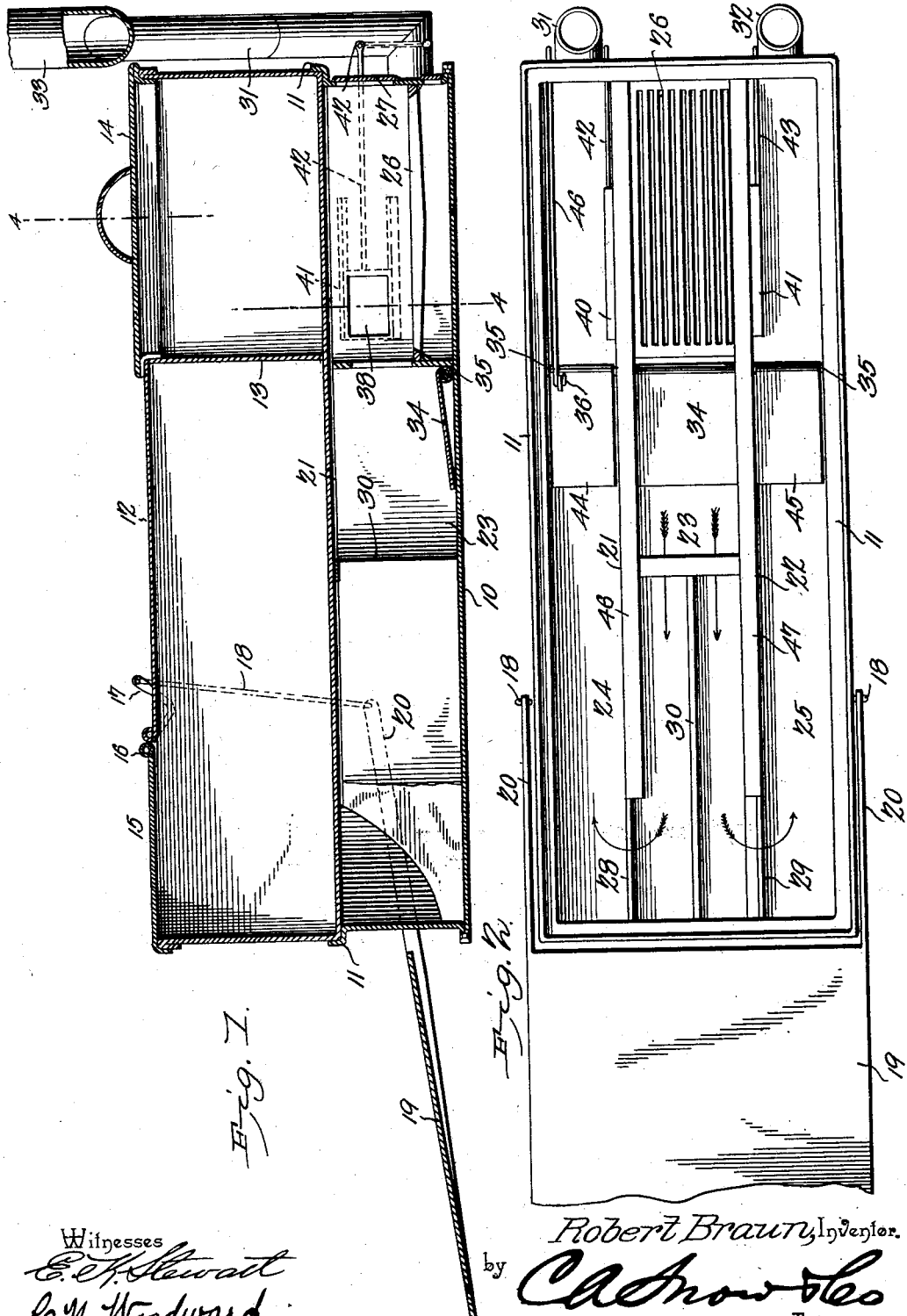
Witnesses
E. F. Stewart
C. N. Woodward
Robert Braun, Inventor.
by C. A. Snow & Co.
Attorneys No. 747,584. PATENTED DEC. 22, 1903.
R. BRAUN.
COMBINED HEATER AND STOCK FEED COOKER.
APPLICATION FILED APR. 16, 1903.
NO MODEL. 2 SHEETS—SHEET 2.
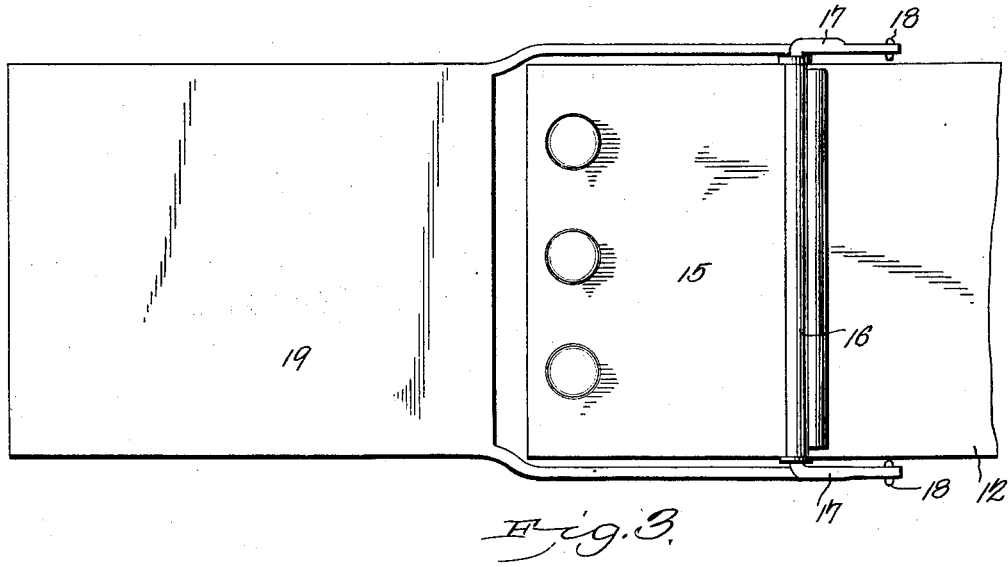
Fig. 3.
Fig. 4.
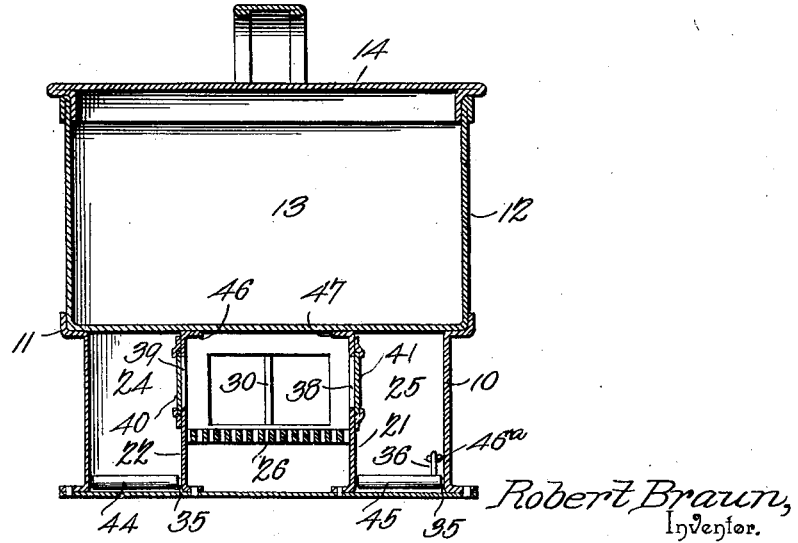
Witnesses
E. J. Stewart
C. N. Woodward
Robert Braun,
Inventor.
by C. A. Snow & Co
Attorneys No. 747,584. Patented December 22, 1903.

UNITED STATES PATENT OFFICE.

ROBERT BRAUN, OF KELLOGG, MINNESOTA.

COMBINED HEATER AND STOCK-FEED COOKER.

SPECIFICATION forming part of Letters Patent No. 747,584, dated December 22, 1903.

Application filed April 16, 1903. Serial No. 152,944. (No model.)

*To all whom it may concern:*

Be it known that I, ROBERT BRAUN, a citizen of the United States, residing at Kellogg, in the county of Wabasha and State of Minnesota, have invented a new and useful Combined Heater and Stock-Feed Cooker, of which the following is a specification.

This invention relates to apparatus employed for heating the drinking-water for animals in cold weather, and has for its object to improve and simplify devices of this character and produce an apparatus in which the heat generated for heating the water may also be utilized in cooking food for the animals and for other purposes; and the invention consists in certain novel features of the construction as hereinafter shown and described, and specified in the claims.

In the drawings illustrative of the invention, in which corresponding parts are denoted by like designating characters, Figure 1 is a longitudinal sectional elevation. Fig. 2 is a plan view of the lower or combination chamber-section. Fig. 3 is a plan view of the watering ends of the apparatus. Fig. 4 is a transverse section on the line 4 4 of Fig. 1.

The improved apparatus comprises generally two portions, the lower or base portion consisting of a casing or shell 10, open at the top and terminating in a flanged rim 11, and the upper portion consisting of a tank or receptacle 12, supported upon the flanged top 11 of lower section, as shown. The tank portion is divided by a transverse partition 13 into two compartments, one relatively somewhat larger than the other, as shown. The smaller compartment is provided with a detachable cover 14 and one end of the other compartment provided with a movable cover 15, hinged at one edge 16, and the pintles of the hinges extended into arms 17, from which rods 18 depend.

At the end of the apparatus adjacent to the closure 15 a platform 19 is disposed and provided with arms 20, extending alongside the base-section 10 and movably connected to the rods 18, so that any weight placed upon the platform will tilt it and cause the cover 15 to be opened. By this arrangement it will be obvious that the weight upon the platform of the animal who desires to drink will cause the cover 15 to open and expose the contents of the tank, and when the animal retires the cover will close by gravity.

Within the base-chamber 10 are arranged longitudinal partitions 21 22, spaced apart, whereby a central compartment 23 and side compartments 24 25 are formed, as shown, the central compartment provided with a grate 26 and fuel-door 27 at one end, and thereby forming the combustion-chamber beneath the smaller of the compartments in the tank formed by the partition 13.

The partitions 21 22 are formed with recesses 28 29 in their ends farthest from the combustion-chamber to provide means for the passage of the smoke, flame, and other products of the combustion from the central compartment to the side compartments, and in order to equalize the influence of the heat and uniformly distribute it a shorter central partition 30 is arranged in the central compartment 23 and extending past the recesses 28 29, which thus divides the currents and deflects an equal amount to each of the side compartments.

The upper edges of the longitudinal partitions 21 22 are formed with lateral flanges 46 47, which serve as intermediate supports to the tank and prevent sagging when filled with water. This is an important feature of the invention and obviates the necessity for bracing the tank or otherwise increasing its strength. By this means a much lighter tank may be employed than would otherwise be possible.

Leading from the ends of the side compartments 24 25 are smoke-discharge flues 31 32, uniting into one at 33, by which means the smoke and other similar products of the combustion are discharged.

At the inner end of the grate 26 a damper 34 is arranged and mounted upon a transverse rod 35, having an extended arm 36, from which an operating-rod 46$^a$ extends through the front wall of the chamber 10, convenient to the hand of the operator.

Piercing the partitions 21 22 adjacent to the damper 34 and opposite the inner end of the grate 26 are apertures 38 39, provided with dampers or closures 40 41, having operating-rods 42 43, also extending through the front wall of the chamber 10 convenient to the hand of the operator. By this means it is obvious that by closing the damper 34 and opening the dampers 40 41 the smoke, flame, and other products of the combustion will be turned directly into the side compartments near the compartment formed by the partition 13 and greatly increase the heat imparted to that part of the apparatus, while at the same time withdrawing its influence entirely from the remainder of the tank. Then if it is required to distribute the heat over the whole length of the tank the dampers 40 41 are closed and the damper 34 opened, when the products of the combustion will be conducted the whole length of the chamber through central compartment and equally divided by the plate 30 and returned through the side compartments 24 25 and discharged by the flues 31 32 into the stack 33. By this means the heat imparted to the tank may be controlled and conducted to any part desired and economized to the largest extent.

The apparatus will be constructed of any suitable material, but will preferably be of galvanized steel or iron, or of light boiler steel of suitable strength.

The parts may be of any relative size and capacity and will be found to be a very convenient and useful device for the purposes described.

If required, the damper-rod 35 may be supplied with additional dampers 44 45, operating in the side compartments 24 25, to more thoroughly cut off the currents of the products of the combustion.

Having thus described the invention, what I claim is—

1. In an apparatus of the character described, a base-chamber divided into a central longitudinal compartment and spaced side compartments, a combustion-chamber in said central compartment, smoke-discharge flues leading from said side compartments, dampers between said combustion-chamber and said side compartments, and a damper between the combustion-chamber and said central compartment, substantially as specified.

2. In an apparatus of the character described, a base-chamber divided by spaced longitudinal partitions into central and side compartments, said partitions extending nearly to the end of the base-chamber and with a combustion-chamber in the opposite end of the central compartment, a dividing-partition centrally disposed in said central compartment and extending past the gaps at the ends of said longitudinal partitions, smoke-discharge flues leading from said side compartments, dampers between said combustion-chamber and said side compartments, and a damper between said combustion-chamber and said central compartment, substantially as specified.

3. In an apparatus of the character described, a base-chamber, a tank supported detachably upon said base-chamber and divided into two compartments, longitudinal partitions in said base-chamber dividing it into central and side compartments, a combustion-chamber in said central compartment beneath one of the tank-compartments, smoke-discharge flues leading from said side compartments, dampers between said combustion-chamber and said side compartments, and a damper between said combustion-chamber and said central compartment, whereby the influence of the fire may be confined to the compartment in the tank above combustion-chamber or extended beneath the more remote tank-compartment, substantially as specified.

4. In an apparatus of the character described, a base-chamber divided into a central longitudinal compartment and spaced side compartments, a combustion-chamber in said central compartment, smoke-discharge flues leading from said side compartments, dampers between said combustion-chamber and said side compartments, a damper between said combustion-chamber and the central compartment, and dampers within said side compartments between the dampers leading thereto and the rear end of the side compartments, substantially as specified.

5. In an apparatus of the character described, a base-chamber divided into a central longitudinal compartment and spaced side compartments, a combustion-chamber in said central compartment, smoke-discharge flues leading from said side compartments, dampers between said combustion-chamber and said side compartments, a rod disposed in said base-chamber in transverse alinement with the inner end of said combustion-chamber, a damper carried by said rod within said central compartment, dampers carried by said rod within said side compartments, and means operating exteriorly of said apparatus for actuating said valve-rod and the valves carried thereby, substantially as specified.

6. In an apparatus of the character described, a base-chamber, a tank supported detachably upon said base-chamber and divided into two compartments, longitudinal partitions in said base-chamber dividing it into central and side compartments and formed with laterally-extended flanges at their upper edges and forming intermediate supports for the tank, a combustion-chamber in said central compartment beneath one of the tank-compartments, smoke-discharge flues leading from said side compartments, dampers between said combustion-chamber and said side compartments, and a damper between said combustion-chamber and said central compartment, whereby the influence of the fire may be confined to the compartment in the tank above the combustion-chamber or extended beneath the more remote tank-compartment, substantially as specified.

In testimony that I claim the foregoing as my own I have hereto affixed my signature in the presence of two witnesses.

ROBERT BRAUN.

Witnesses:
CHAS. J. STAUFF,
JOHN ROBINSON.